United States Patent [19]

Wilson et al.

[11] 4,331,543

[45] May 25, 1982

[54] METHOD OF RETARDING DEGRADATION OF SURFACTANTS EMPLOYED IN WATERFLOODING

[75] Inventors: Peggy M. Wilson; Julie Pao, both of Dallas, Tex.

[73] Assignee: Mobil Oil Corporation, New York, N.Y.

[21] Appl. No.: 951,899

[22] Filed: Oct. 16, 1978

[51] Int. Cl.³ .............................................. E21B 43/27
[52] U.S. Cl. ................................. 252/8.55 D; 166/275
[58] Field of Search .................. 252/8.55 D; 166/274, 166/275; 260/512 R

[56] References Cited

U.S. PATENT DOCUMENTS

| | | | |
|---|---|---|---|
| 3,282,337 | 11/1966 | Pye | 166/274 |
| 3,508,612 | 4/1970 | Reisberg et al. | 166/274 |
| 3,739,848 | 6/1973 | Lawson et al. | 166/274 |
| 3,827,497 | 8/1974 | Dycus et al. | 166/274 |
| 3,977,471 | 8/1976 | Gale et al. | 166/273 |
| 4,018,278 | 4/1977 | Shupe | 166/252 |
| 4,066,124 | 1/1978 | Carlin et al. | 166/252 |
| 4,077,471 | 3/1978 | Shupe et al. | 166/275 |
| 4,108,830 | 8/1978 | Kline | 260/45.85 |
| 4,124,073 | 11/1978 | Wier | 166/272 |

FOREIGN PATENT DOCUMENTS 1518628  7/1978  United Kingdom ................ 166/275

OTHER PUBLICATIONS

Donbrow et al., "Development of Acidity in Non-Ionic Surfactants: Formic and Acetic Acid", *Analyst*, vol. 103, 1978, pp. 400–402.
Schwartz et al., *Surface Active Agents and Detergents*, vol. II, 1958, pp. 71–78 and 91–93.
Gould, *Mechanism and Structure in Organic Chemistry*, Mar. 1964, pp. 705–710.

*Primary Examiner*—Herbert B. Guynn
*Attorney, Agent, or Firm*—Charles A. Huggett; Michael G. Gilman; Claude E. Setliff

[57] ABSTRACT

A process for the recovery of oil from subterranean oil reservoirs by waterflooding employing ether-linked sulfonate surfactants in which oxidative degradation of the surfactant is retarded through the establishment of an anaerobic condition in the surfactant solution or through the use of oxidation inhibitors. The anaerobic condition may be provided by mechanical means such as scrubbing the injected water with an inert gas in order to remove oxygen or by employing produced well water which is handled under a closed system to exclude oxygen. A preferred class of oxidation inhibitors are sterically hindered phenolic compounds which function as free radical chain inhibitors.

5 Claims, 9 Drawing Figures

METHOD OF RETARDING DEGRADATION OF SURFACTANTS EMPLOYED IN WATERFLOODING

BACKGROUND OF THE INVENTION

This invention relates to the recovery of oil from subterranean oil reservoirs and more particularly to improved waterflooding operations involving the injection of an aqueous solution of a surface-active ether-linked sulfonate.

In the recovery of oil from oil-bearing reservoirs, it usually is possible to recover only minor portions of the original oil in place by the so-called primary recovery methods which utilize only the natural forces present in the reservoir. Thus, a variety of supplemental recovery techniques has been employed in order to increase the recovery of oil from subterranean reservoirs. The most widely used supplemental recovery technique is waterflooding, which involves the injection of water into the reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus, it has been proposed to add surfactants to the flood water in order to lower the oil-water interfacial tension and/or to alter the wettability characteristics of the reservoir rock. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

Processes which involve the injection of aqueous surfactant solutions are commonly referred to as surfactant waterflooding or as low tension waterflooding, the latter term having reference to the mechanism involving the reduction of the oil-water interfacial tension. Thus far, many such waterflooding applications have employed anionic surfactants. One problem encountered in waterflooding with certain of the anionic surfactants such as petroleum sulfonates is the lack of stability of these surfactants in a so-called "high brine" environment. These surfactants tend to precipitate from solution in the presence of monovalent salts such as sodium chloride in concentrations in excess of about 2 to 3 weight percent and in the presence of much lower concentrations of divalent metal ions such as calcium and magnesium ions. In view of this disability of the petroleum sulfonates and similar anionic surfactants, various surfactant formulations which contain anionic ether-linked sulfates that tolerate high salinities and/or high divalent metal ion concentrations have been proposed for use in high brine environments. Thus, U.S. Pat. No. 3,508,612 to Reisberg et al. discloses a low tension waterflooding process employing a calcium-compatible anionic-anionic surfactant system containing an organic sulfonate such as a petroleum sulfonate and an ether-linked sulfate, i.e. a sulfated oxyalkylated alcohol or a sulfated polyoxyalkylated alkyl phenol.

Another waterflooding technique involving the use of calcium-compatible surfactant systems containing an ether-linked anionic surfactant is disclosed in U.S. Pat. No. 3,827,497 to Dycus et al. In this process, a three-component or two-component surfactant system may be employed. The three-component system comprises an organic sulfonate surfactant such as a petroleum sulfonate, a polyalkylene glycol alkyl ether, and an ether-linked surfactant which is a salt of a sulfonated or sulfated oxyalkylated alcohol. The two-component system comprises an organic sulfonate surfactant and an ether-linked surfactant which is a salt of a sulfonated oxyalkylated alcohol. These surfactant systems may be employed in a brine solution which, as noted in column 3, will usually contain about 0.5–8 percent sodium chloride and will often contain 50–50,000 ppm polyvalent metal ions such as calcium and/or magnesium ions. The sulfated or sulfonated oxyalkylated alcohols may be derived from aliphatic alcohols of 8–20 carbon atoms or from alkyl phenols containing 5–20 carbon atoms per alkyl group. The oxyalkyl moiety in the ether-linked surfactant usually is derived from ethylene oxide although other lower alkylene oxides containing 2–6 carbon atoms or mixtures thereof may be employed. Dycus et al. disclose that the sulfonated oxyalkylated alcohols in combination with the organic sulfonate have improved hydrolytic stability over similar formulations employing sulfated oxyalkylated alcohols as disclosed in the Reisberg et al. patent.

Another surfactant waterflooding process employing an ether-linked sulfonate surfactant in high salinity environments and in high temperature reservoirs, i.e. temperatures of 120° F. or more, is disclosed in U.S. Pat. No. 3,977,471 to Gale et al. This patent discloses the use of an $R_1$ hydrocarbyl ether-linked $R_2$ hydrocarbyl sulfonate which is characterized as having a low rate of hydrolysis in the presence of aqueous liquids at higher reservoir temperatures. The $R_1$ lipophilic base is provided by a benzene, toluene, or xylene radical having an alkyl substituent containing 6–24 carbon atoms and the $R_2$ group linking the sulfonate group with the alkoxy ether group is a $C_1$–$C_8$ alkyl, cycloalkyl, alkene or aryl radical. The $R_2$ hydrocarbyl group may be substituted with a hydroxy group or a $C_1$–$C_8$ aliphatic group. Dodecyl dimethyl benzene ether [EO]$_4$ propane sulfonate is specifically disclosed by Gale et al. The Gale et al. process is said to be particularly useful in reservoirs having high salinity brines, i.e. salinities of 2 percent or more, and the dodecyl dimethyl benzene ether [EO]$_4$ propane sulfonate is said to be stable in saline solutions containing from 7–14 weight percent sodium chloride and to not hydrolyze in water at 150° F. for at least 6 months.

Gale et al. also disclose the use of the ether-linked sulfonates in liquid hydrocarbon solvents or in microemulsions. The microemulsion contains a refined or crude oil, an aqueous medium, and the ether-linked sulfonate. In addition, the microemulsion may contain a co-surfactant. Particularly effective co-surfactants are said to include alcohols, ethoxylated alcohols, sulfated ethoxylated alcohols, sulfonated ethoxylated alcohols, ethoxylated phenols, sulfated ethoxylated phenols and synthetic sulfonates. Alcohols disclosed in Gale et al. for use as microemulsion co-surfactants include $C_3$–$C_{20}$ aliphatic alcohols such as isopropanol, isobutanol, tertiary butanol, amyl alcohols, hexanols, octanols, and dodecanols. The patentees specifically disclose flooding with microemulsion systems containing 91 percent to 93 percent water, containing 6 percent sodium chloride, 5 percent oil, 1 percent to 3 percent dodecyl dimethyl benzene ether [EO]$_4$ propane sulfonate, and 1 percent butyl alcohol.

Yet another surfactant waterflooding process involving the use of ether-linked sulfonates is disclosed in U.S. Pat. No. 4,018,278 to Shupe. The ether-linked surfactants employed in Shupe include sulfonated polyethoxylated aliphatic alcohols and sulfonated polyethoxylated alkyl phenols. The patentee discloses the use of the ether-linked sulfonates alone or as a co-surfactant with anionic surfactants such as petroleum sulfonates and in high brine environments, e.g. in a solution having a salinity of 183,000 ppm and a total hardness of 9400 ppm. This surfactant system is said to exhibit good thermal stability and to be particularly useful at temperatures in excess of 120° F.

Additional disclosures involving the use of ether-linked sulfonates in surfactant waterflooding are found in U.S. Pat. No. 4,066,124 to Carlin et al. and U.S. Pat. No. 4,077,471 to Shupe et al. Carlin et al. disclose the use of alkyl or alkylaryl polyethoxyalkyl sulfonates as solubilizing co-surfactants in conjunction with predominantly water-soluble and partially oil-soluble petroleum sulfonates of dissimilar average equivalent weights. Shupe et al. disclose the use of a surfactant blend of a water-insoluble ethoxylated alkylaryl or ethoxylated aliphatic compound and a water-soluble alkyl or alkylaryl polyalkoxyalkyl sulfonate in which the ether linkage is provided by ethoxy groups or a mixture of ethoxy and propoxy groups with the ethoxy groups predominating. Both Carlin et al. and Shupe et al. describe their surfactant formulations as being stable in high brine and high temperature environments with Shupe et al. specifying the use of their process at formation temperatures ranging from about 70° F. to about 300° F.

SUMMARY OF THE INVENTION

In accordance with the present invention, there is provided a new and improved waterflooding process employing an ether-linked sulfonate surfactant in which oxidative degradation of the ether-linked sulfonate within the reservoir is retarded by providing an anaerobic condition in the injected aqueous solution of the ether-linked sulfonate or by employing an oxidation inhibitor or by using both techniques in combination. The anaerobic condition of the injected surfactant solution may be established through the use of surface mechanical means such as by deaeration or production of subsurface water and subsequent reinjection in an inert atmosphere. Preferred oxidation inhibitors are sterically hindered phenolics which function as free radical chain inhibitors.

DESCRIPTION OF SPECIFIC EMBODIMENTS

Ether-linked sulfonates are old and well known in the detergent art. For example, Schwartz et al., SURFACE ACTIVE AGENTS AND DETERGENTS, Vol. II, 1958, Interscience Publishers, Inc., New York, disclose ether-linked sulfonates under the headings "Sulfonates with Intermediate Linkages" at pages 71–78 and "Alkylarylsulfonates with Intermediate Linkages" at pages 91–93. As noted in the previously described patents, an asserted characteristic of such ether-linked sulfonates is their stability under high temperature conditions which often are encountered in subterranean oil reservoirs. For example, the aforementioned patent to Shupe discloses thermal degradation rates for various aqueous solutions of a sulfonated polyethoxylated $C_{10}$–$C_{12}$ aliphatic alcohol comprised of about 60 percent ethylene oxide and based upon these studies concludes that for solutions of a near neutral pH the surfactant half-life at 240° F. ranges from 12.3 years for an "impure" ether-linked sulfonate in distilled water to 220 years for a mixture of the ether-linked sulfonate and a linear alkyl benzene sulfonate in deionized water at a pH of 7.5. The other references to Dycus, Gale et al., Carlin et al., and Shupe et al. similarly reflect the prior art view that the ether-linked sulfonates are stable at the temperatures encountered in subterranean oil reservoirs even in the presence of significant amounts of divalent metal ions.

Contrary to these prior art teachings and as indicated by the hereinafter experimental work, ether-linked sulfonates of the type disclosed in the aforementioned references are subject to degradation in aqueous solutions in the temperature and salinity environments of the type commonly encountered in surfactant waterflooding. Decomposition of the surfactant molecules occurs in aqueous solutions containing free oxygen and the degradation reaction appears to involve an oxygen initiated autoxidative mechanism and is severe even at moderately elevated temperatures on the order of 70°–80° C.

The present invention provides a technique for maintaining the chemical stability of surface-active ether-linked sulfonates employed in waterflooding. In the broadest application of the invention, degradation of the ether-linked sulfonate within the reservoir is retarded through the establishment of an anaerobic condition in the injected surfactant solution or through the use of oxidation inhibitors or by a combination of these procedures. Techniques for reducing the oxygen content of water employed in waterflooding operations are well known in the art. For example, various polymeric thickening agents employed for mobility control in waterflooding are subject to chemical degradation in the presence of oxygen and various palliative procedures have heretofore been proposed for the removal of oxygen from injected aqueous solutions of these polymers. For example, U.S. Pat. No. 3,282,337 to Pye discloses waterflooding with various organic polymers in which the flooding medium is rendered substantially free of molecular oxygen by any one or by a combination of several procedures. Thus, one technique disclosed by Pye involves the use of "well water" which is produced to the surface and handled in a closed system whereby oxygen is excluded. Another procedure disclosed by Pye involves scrubbing the water with an inert gas preferably at an elevated temperature in order to remove oxygen. The patentee also discloses the use of chemical oxygen scavenging agents in order to chemically remove oxygen from the polymer solution. Oxygen scavengers disclosed by Pye include alkali metal hydrosulfides and hydrides, hydrazine and organic agents such as pyrogallol. A water-soluble hydrosulfite salt with cobaltous ions is disclosed as a particularly efficient scavenging agent. Other oxygen scavenging agents disclosed for use in stabilizing aqueous solutions of polysaccharides are disclosed in British Pat. No. 1,518,628 to Wellington. Water-soluble inorganic compounds that contain or form ions that contain an $SO_3$ group or a closely analogous group are described as particularly suitable oxygen scavengers. Such compounds include water-soluble alkali metal sulfites and dithionites which are employed in conjunction with an easily oxidized water-soluble alcohol or glycol.

Procedures similar to those disclosed in the aforementioned patents may be employed in removing dissolved oxygen from the aqueous surfactant solutions employed in the present invention. Thus, the injected water may be subjected to countercurrent stripping with a suitable gas such as natural gas that is free of oxygen and hydrogen sulfide in order to elute oxygen. Other techniques such as vacuum deaeration or the use of well water produced under and handled in an inert atmosphere, e.g. under a blanket of natural gas or nitrogen, can be employed.

Other techniques which may be used in accordance with the present invention to retard degradation of the ether-linked sulfonate surfactants include the use of oxidation inhibitors. Such oxidation inhibitors function in the presence of free oxygen in the surfactant solution to prevent or slow down the oxidative decomposition of the surfactant molecule. Oxidation inhibitors which may be employed in this regard include sterically hindered phenols such as 2,6-di-tert.-butyl phenol and 2,6-di-tert.-butyl-4-hydroxymethyl phenol, aromatic amines or nitrogenous ring compounds such as phenyl alpha-naphthyl amine, piperazine, and N-methyl piperazine, transition metal chelates such as nickel acetophenone oxime and chelates of ferrous ions, disulfides and nitrogenous sulfur compounds such as tert.-butyl disulfide, 2-mercaptoimidazoline, N,N-dialkyldithiocarbamates such as nickel, cobalt, or zinc, N,N-diethyldithiocarbamate, nickel dithiophosphate, and cobalt thiobisphenolate. Natural products such as quinones and lignin and lignin derivatives may also be employed as oxidation inhibitors. Enzymic oxidation inhibitors such as ascorbic acid may also be used although, as indicated by the subsequently described experimental data, with less effectiveness than the free radical chain inhibitors.

As understood by those skilled in the art, surfactant molecules are characterized by a lipophilic group which is oil soluble and tends to partition into the oil phase of an oil-water interface and a hydrophilic group which is water soluble and tends to partition into the water phase. The ether-linked sulfonates to which the present invention is applicable may be of any suitable type in which the lipophilic surfactant base is linked to the sulfonate group through a group having a ratio of carbon atoms to oxygen atoms within the range of 2 to 3. Stated otherwise, the ether linkage is derived from ethylene oxide or propylene oxide or mixtures of ethylene oxide and propylene oxide. As noted in the aforementioned patent to Shupe et al., it is preferred that the ethylene oxide groups predominate. The number of alkoxy groups in the ether linkage will vary depending upon such factors as the character of the lipophilic surfactant base and the salinity of the aqueous surfactant solution as taught for example in Gale et al. but normally the ether linkage will contain from 1 to 20 alkylene oxide units.

Any suitable hydrocarbon group may be employed to provide the lipophilic base of the surfactant as disclosed in the aforementioned patents to Dycus et al., Gale et al., Shupe, Carlin et al., and Shupe et al. Thus, the lipophilic base of the anionic ether-linked sulfonates may be provided by aliphatic groups or aliphatic substituted aryl groups. Where the lipophilic base is provided by an aliphatic substituted aryl group, the aryl component may be mononuclear, e.g. benzene, or dinuclear, e.g. naphthalene, and contains one or more aliphatic substituents. Normally, the aryl component will be mononuclear in view of the practical consideration of economy and product availability. As understood by those skilled in the art, surfactant waterflooding processes are specific with regard to the reservoirs in which they are applied. This specificity depends upon a number of factors including the composition of the reservoir oil, the ionic character of the reservoir water and the water used in formulating the injected surfactant solution, and the reservoir temperature. Thus as recognized, for example, in the aforementioned patent to Gale et al., the hydrophilic-lipophilic balance (HLB) of the surfactant may be adjusted over a wide range to the value which is most effective in the recovery of oil from the particular reservoir involved. In most cases, where the lipophilic base is provided by an aliphatic radical, it should contain from 10 to 22 carbon atoms. Where the lipophilic base contains an aryl group, it is substituted with one or more aliphatic groups, at least one of which has 6 or more carbon atoms with the total number of aliphatic carbon atoms being within the range of 8-24. The aliphatic groups or aliphatic substituents may be unsaturated and/or contain branched chains or may take the form of normal alkyl radicals.

The ether-linked sulfonates as described above may be characterized by the formula:

$$R_1-O(C_nH_{2n}O)_xR_2-SO_3M \qquad (1)$$
$$\quad\quad\quad\quad\quad\;\; |\\R_3$$

wherein
$R_1$ is lipophilic base provided by a $C_{10}$ to $C_{22}$ aliphatic group or an aliphatic substituted aryl group containing from 8 to 24 aliphatic carbon atoms with at least one aliphatic substituent containing at least 6 carbon atoms, n is 2 to 3, x is a number within the range of 1 to 20, $R_2$ is a $C_1$ to $C_4$ saturated aliphatic hydrocarbon group, $R_3$ is a hydrogen, a hydroxy group or a methyl group, and M is an alkali metal, ammonium, or substituted ammonium ion.

Where M is an alkali metal ion, it usually will take the form of sodium or potassium. Substituted ammonium ions which may be employed include mono-, di-, or tri-substituted alkylammonium or alkanolammonium ions. Examples of alkylammonium ions include methylammonium, ethylammonium, and normal or isopropylammonium ions and examples of alkanolammonium ions include monoethanolammonium and triethanolammonium ions.

Preferably the ether linkage is provided by one or more ethylene oxide groups because of the increased water solubility imparted to the molecule. Thus, in a preferred form of surfactant characterized by formula (1), n is 2 and x is a number within the range of 1 to 6. In the case where $R_1$ is an aliphatic group, it preferably contains from 12 to 20 carbon atoms. In the case where $R_1$ is an aliphatic substituted aryl group, the aliphatic substituents preferably contain from 12 to 18 carbon atoms. In this instance, as noted previously, it is desirable that a mononuclear aryl radical such as benzene, toluene, or xylene be employed. As indicated by the formula, the saturated aliphatic hydrocarbon group connecting the sulfonate group with the ether linkage is provided by a $C_1$ to $C_4$ alkane group which may be unsubstituted or which may be substituted by a hydroxy group or a methyl group. Preferably, however, the saturated aliphatic hydrocarbon linkage is provided by an ethane or propane group which is unsubstituted or substituted by a hydroxy group. That is, $R_2$ contains 2 or 3 carbon atoms and $R_3$ is a hydrogen atom or hydroxy group.

Experimental work relative to the present invention was carried out employing a number of surfactants identified herein as surfactants S-1 through S-10. Surfactants S-1–S-5 and S-7–S-10 were sodium salts of sulfonated ethoxylated aliphatic alcohols characterized by the formula:

$$R\text{—}O(C_2H_4O)_m\text{—}C_3H_6\text{—}SO_3Na \qquad (2)$$

In surfactants S-1 and S-2, R was a dodecyl group and m was 3 and 4, respectively. For surfactants S-3 and S-4, R was a hexadecyl group and m was 2 and 3, respectively. Surfactant S-5 contained an average of about 3.8 ethoxy groups and R was a mixture of alkyl groups containing from about 12 to 18 carbon atoms with an average alkyl chain length of about 16 carbon atoms. Surfactants S-7, S-8, and S-9 contained 1, 2, and 4 ethoxy groups, respectively, and in each case R was an octadecyl group. For surfactant S-10, R was a $C_{20}$ alkyl group and m was 2. Surfactant S-6 was an alkylaryl polyethoxy propane sulfonate characterized by the formula:

(3)

wherein $R_1$ and $R_2$ were isononyl groups and m was an average of 6.5. An additional surfactant employed in the experimental work and identified herein as surfactant S-12 was an octadecyl ether propane sulfonate characterized by the formula:

$$C_{18}H_{36}OC_3H_6SO_3Na \qquad (4)$$

In the experimental work, aqueous solutions of the surfactants were prepared in distilled water or in brine solutions identified hereinafter at concentrations ranging from about 2,000 to 10,000 ppm. Portions of the surfactant solutions were then placed in glass vials. Unless noted otherwise, in each case several cubic centimeters of air space were left in the vial in order to ensure that atmospheric oxygen was available to the sample. The vials were then sealed and placed in an oven which was maintained at a temperature of 76° C. where they were aged for periods ranging up to 23 days. During the aging period, samples were withdrawn from the vials at intervals and titrated in order to determine the amount of sulfonate surfactant remaining in solution at the elapsed time. The results of this experimental work are presented graphically in FIGS. 1 through 9 of the drawings. For convenience, the initial surfactant concentrations for the test results disclosed in the drawings are set forth in Table I wherein the first column identifies the surfactant by the previously described designations and the remaining columns set forth the initial surfactant concentrations in the solutions of FIGS. 1 through 9. The surfactant concentrations are given in parts per million of the surfactant on an active basis.

TABLE I

| Sur-factant | Initial Concentrations, in ppm, of Solutions in FIGS. | | | | | | | |
|---|---|---|---|---|---|---|---|---|
| | 1 | 2 | 3 | 4,5 | 6 | 7 | 8 | 9 |
| S-1 | | 3500 | | | | | | |
| S-2 | | 8600 | | | | 8700–10,000 | | 9700–9800 |
| S-3 | | 2200 | | | | | | |
| S-4 | | 4200 | | | | | | |
| S-5 | | | | | 4600 | | | |
| S-7 | 2700 | | | 2700 | | | | |
| S-8 | 3300 | 2400 | | 3300 | | | | |
| S-9 | 4800 | | 6700–8400 | | | | 4800 | |
| S-10 | | 3300 | | | | | | |
| S-12 | 2000 | | | 2000 | | | | |

Figure 1:
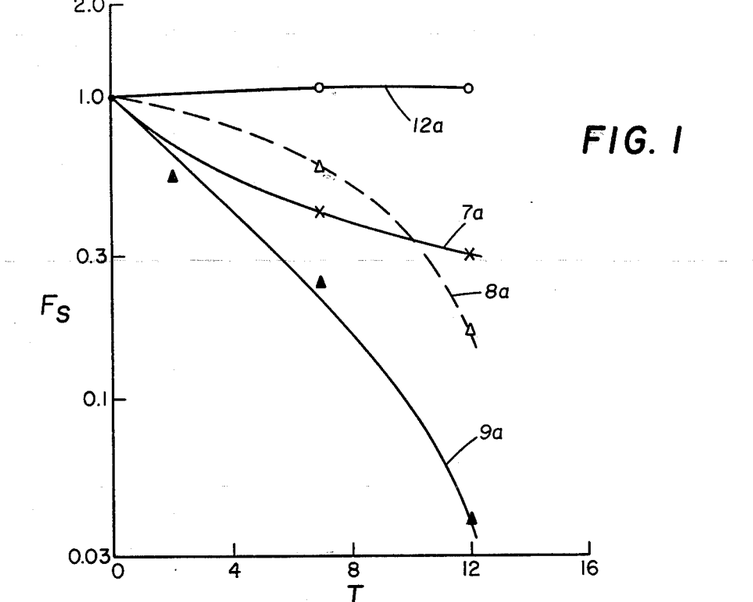
FIGS. 1 and 2 are graphs illustrating the degradation in aqueous solutions of ether-linked sulfonates with time.

In a first set of experiments, aqueous solutions of the $C_{18}$ surfactants (S-7, S-8, S-9, and S-12) were prepared in distilled water and aged at 76° C., as described above. The results of these experiments are set forth in FIG. 1 which is a graph of the logarithm of the fraction of surfactant remaining in solution, $F_S$, plotted on the ordinate versus the elapsed time, T, in days plotted on the abscissa. The curves shown in FIG. 1 are identified by the same numerals as used in the surfactant designation described above, suffixed by "a". Thus, curve 9a, for example, illustrates the rate of degradation for the octadecyl polyethoxy propane sulfonate previously identified as surfactant S-9. From examination of the data presented in FIG. 1, it can be seen that the surfactants S-7, S-8, and S-9 are decomposed rapidly with the rate of degradation appearing to increase with the ethylene oxide content of the surfactant. The surfactant S-12 which did not contain an ethylene oxide group appeared to undergo no degradation over the time interval tested. The small gain in apparent surfactant concentration illustrated by curve 12a is likely due to evaporative loss during the sampling procedure.

Figure 2:
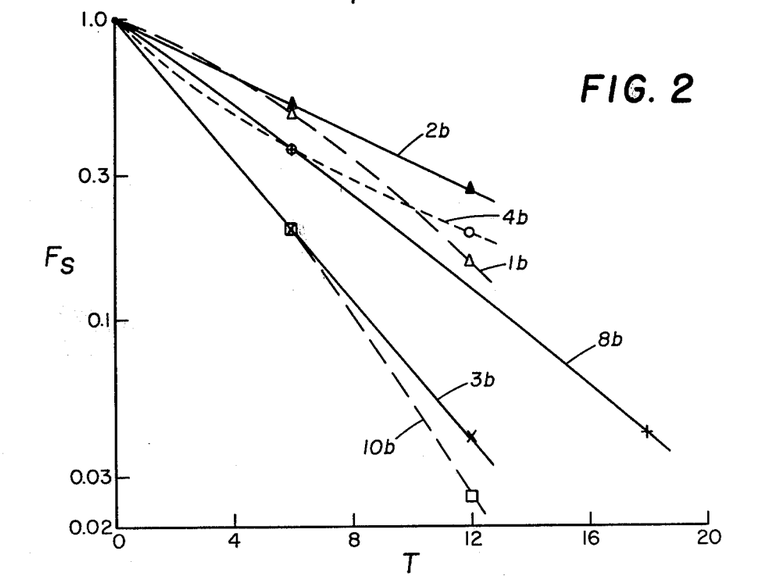
Figure 3:
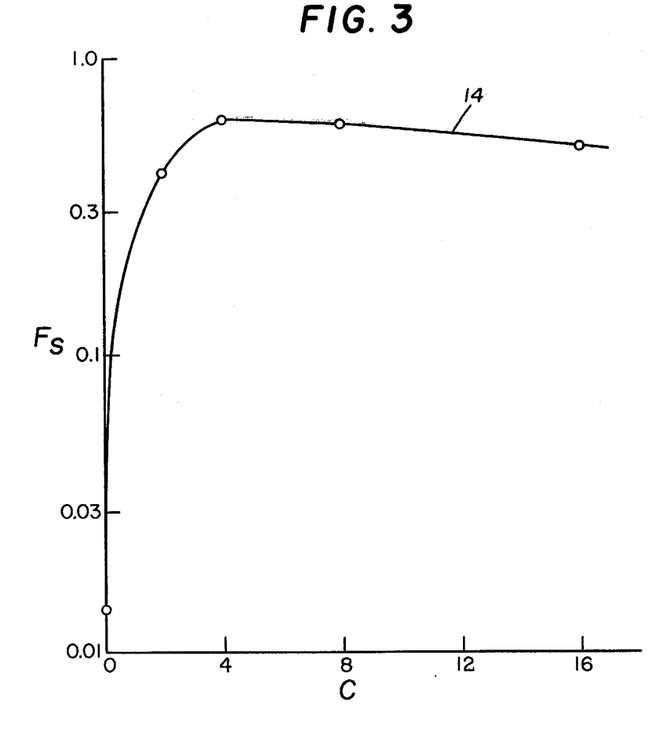
FIG. 3 is a graph illustrating the effect of sodium chloride on the stability of ether-linked sulfonates in aqueous solutions.

FIG. 2 is a similar graph of the logarithm of the surfactant fraction, $F_S$, versus the elapsed time, T, in days for distilled water solutions of the surfactants S-1 through S-4, S-8, and S-10. The curves in FIG. 2 are identified similarly as in the case of FIG. 1 by the same numeral employed to designate the surfactant suffixed in this case by the letter "b". The data presented in FIG. 2, with respect to the lower molecular weight dodecyl and hexadecyl homologs, would appear to suggest a contradiction to the relationship indicated by FIG. 1 between the rate of degradation and the ethylene oxide content of the surfactant. However, this apparent inconsistency is at least partially resolved when it is recalled as indicated in TABLE I that the more highly ethoxylated dodecyl and hexadecyl homologs were employed in the solutions of FIG. 2 at significantly higher concentrations than the surfactants of lower ethylene oxide content. Thus, when the data in FIG. 2 is examined from the viewpoint of the initial molar concentrations of the surfactants, it is found that the degradation rate is greater at lower concentrations of surfactants. This suggests that the initial ratio of available oxygen in the solution per surfactant ethoxy group may be important to the progress of the degradation reaction. In any case, the rate of degradation appears to increase at higher degrees of ethoxylation and at lower concentrations of the ether-linked sulfonate.

Additional experimental work was carried out to determine the effect of electrolytes on the rate of degradation of the ether-linked sulfonates. In this work, solutions of the surfactant S-9 in aqueous solutions ranging from distilled water up to 16 weight percent sodium chloride were aged at 76° C. over a 23-day period. The results of this set of experiments are set forth in FIG. 3 in which curve 14 is a graph of the logarithm of the fraction of surfactant remaining in solution, $F_S$, plotted on the ordinate versus the sodium chloride concentration, C, in weight percent plotted on the abscissa. As indicated by curve 14, the presence of sodium chloride in solution appears to induce a structure that provides some resistance to the degradation mechanism with the maximum protection occurring at about 4 percent sodium chloride and thereafter declining gradually as the sodium chloride concentration increases.

Figure 4:
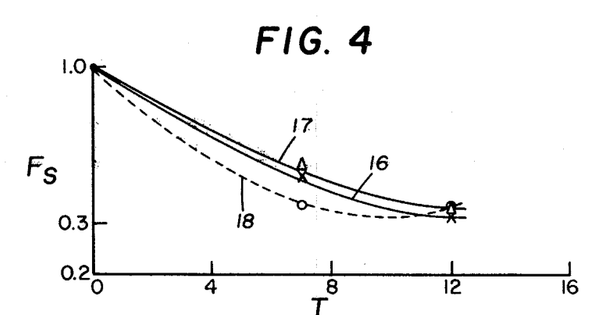
FIGS. 4, 5, and 6 are graphs illustrating the degradation of ether-linked sulfonates in solutions of distilled water, sodium chloride, and mixed brines containing divalent metal ions.
Figure 5:
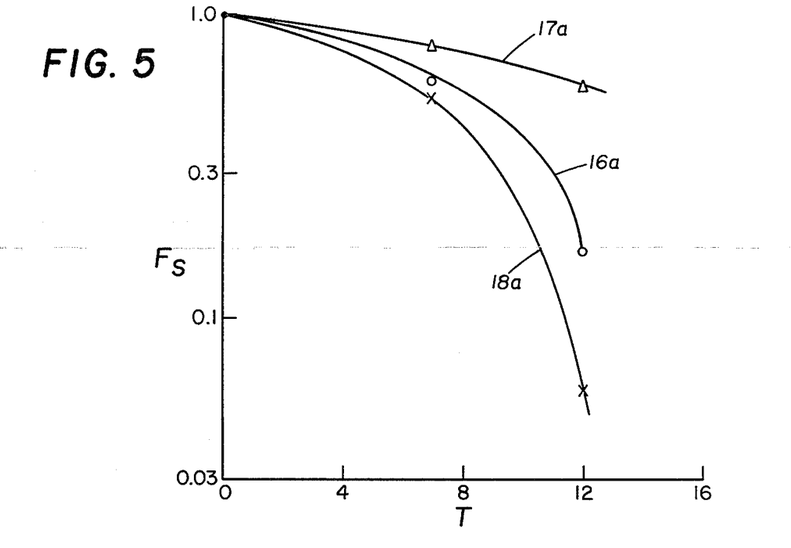
Figure 6:
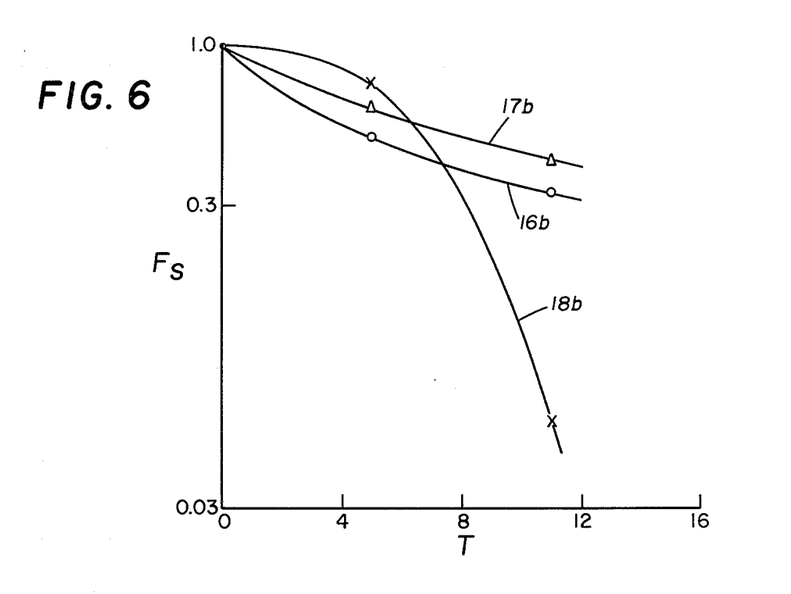

It will be recalled that an asserted advantage of the ether-linked sulfonates is their ability in high brine solutions containing substantial amounts of divalent metal ions. FIGS. 4, 5, and 6 illustrate the results of degradation experiments carried out in distilled water, in a 4 percent sodium chloride solution, and in a mixed brine having about 5700 parts per million calcium and magnesium ions in the form of the chloride salts and about 6.6 weight percent sodium chloride to provide a total salinity of 8.3 weight percent. In FIG. 4, curves 16, 17, and 18 are graphs of the logarithm of the surfactant fraction, $F_S$, remaining in solution plotted on the ordinate versus the time, T, in days plotted on the abscissa for solutions of the surfactant S-7 in distilled water, 4 percent sodium chloride and the mixed brine, respectively. Similar graphs are shown in FIGS. 5 and 6 for the surfactants S-8 and S-5, respectively, with corresponding curves being designated by the same reference numerals suffixed by "a" in FIG. 5 and by "b" in FIG. 6. As can be seen from an examination of FIGS. 4, 5, and 6, the apparent stabilization effect produced by the sodium chloride in solution is not present when the divalent calcium and magnesium ions are also present. In fact, the mixed brine containing the divalent metal ions resulted in a higher rate of degradation than that found for distilled water. Thus, the invention is particularly applicable where the ether-linked sulfonates are employed in solutions containing significant concentrations of divalent metal ions of 0.05 weight percent or more.

Figure 7:
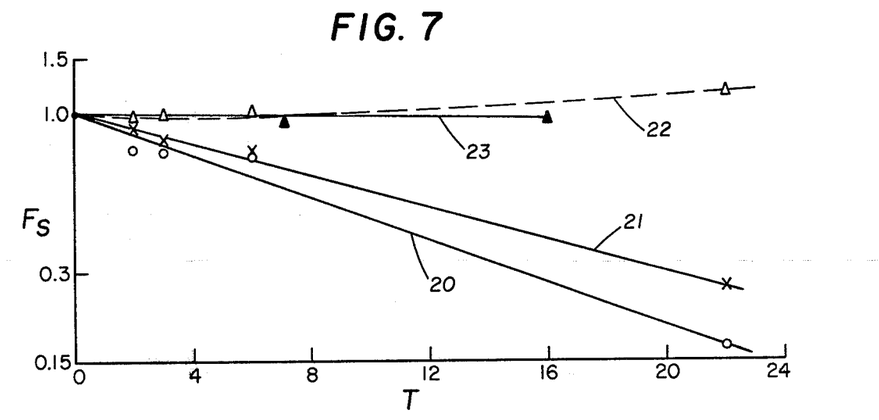
FIGS. 7, 8, and 9 are graphs illustrating the effectiveness of various protective measures employed to retard the degradation of ether-linked sulfonates in aqueous solutions.

Further experimental work was carried out employing oxidation inhibitors and oxygen scavenging agents to determine their effect on the stability of the ether-linked sulfonates in distilled water. The results of one set of such experiments are illustrated in FIG. 7 in which the curves shown are plots of the logarithm of the surfactant fraction, $F_S$, remaining in solution plotted on the ordinate versus time in days plotted on the abscissa. The surfactant employed in this experimental work is the dodecyl derivative identified as surfactant S-2. Curve 20 is a "control" curve showing the degradation rate without the use of stabilizing additives. Curve 21 illustrates the rate of degradation of the surfactant in a solution containing an oxygen scavenger comprised of 0.1 weight percent sodium sulfite and 0.5 part per million of cobalt ion. Curves 22 and 23 show the rates of degradation observed when employing antioxidants which in each use were present at concentrations of 0.1 weight percent. The antioxidants employed in those experiments were 2,6-di-tert.-butyl phenol (curve 22) and 2,6-di-tert.-butyl-4-hydroxymethyl phenol (curve 23) both of which function as free radical chain stoppers. The increase in surfactant concentration observed for curve 22 is thought to be due to evaporative losses similarly as in the case of curve 12a of FIG. 1. As indicated by FIG. 7 and as further shown by additional experimental work described hereinafter, the free radical chain stopper type of antioxidant appears to totally inhibit the degradation of the surfactant over the time intervals measured. On the other hand, the use of oxidase antioxidants, while providing some protection against surfactant degradation, was far less effective than the free radical chain stoppers.

In view of the relative effectiveness of the various inhibition systems as observed in the course of the experimental work described herein, it would appear that the degradation reaction of the ether-linked sulfonates is autoxidative once it is initiated and that it proceeds by free radical chain reaction. Several changes were observed in the course of the degradation of the ether-linked sulfonates. The solution pH declined sharply. The odor of aldehydes and short fatty acids became evident and insoluble waxy precipitates coated the walls of the glass vials used in the degradation experiments. Thus, the mechanism would appear to be similar to the free radical degradation of polyoxyethylene chains of nonionic surfactants as described in Donbrow, M., et al., "Development of Acidity in Non-ionic Surfactants: Formic and Acetic Acid", Analyst, Vol. 103, pp. 400–402 (1978). The free radical autoxidative mechanism occurs notwithstanding that the alkoxylated moiety in the ether-linked sulfonates is not an end group but is capped by an alkyl sulfonate group.

Figure 8:
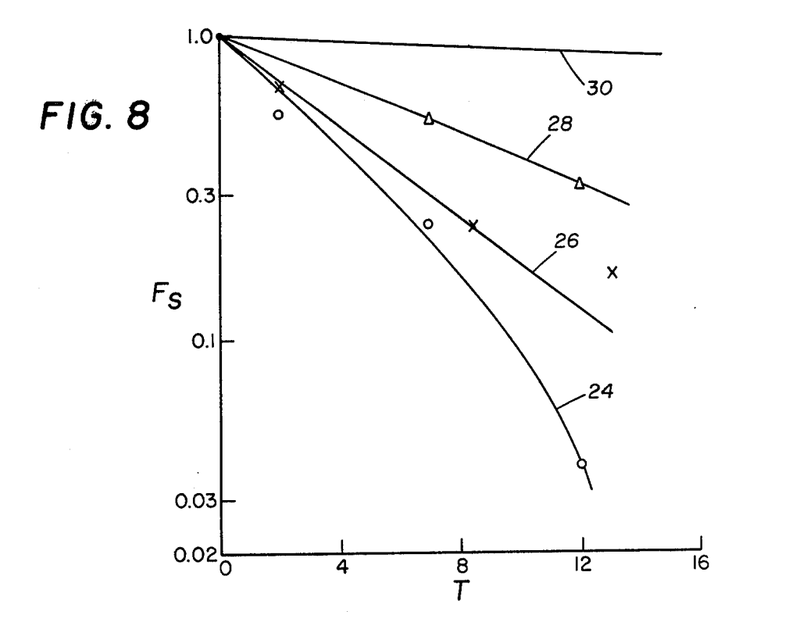

FIG. 8 illustrates the results of additional experimental work carried out to test several means of protection against the autoxidative destruction of surfactant S-9 in distilled water. in FIG. 8, the several curves shown are graphs of the logarithm of the surfactant fraction, $F_S$, plotted on the ordinate versus the elapsed time, T, in days plotted on the abscissa. In FIG. 8, curve 24 is a duplication of curve 9a in FIG. 1 provided for purposes of comparison. Curve 26 illustrates the rate of degradation of the surfactant solution containing 10 or 120 parts per million of ascorbic acid which acts as an inhibitor of enzymic oxidation. As can be seen, the ascorbic acid provided only negligible protection against the degradation mechanism. Although not shown in FIG. 8, an oxygen scavenging system comprised of 177 parts per million cobalt ion with 0.1 or 0.5 weight percent sodium sulfite failed to provide any protection against the degradation mechanism and in fact appeared to even accelerate the rate of degradation somewhat. Curve 28 illustrates the results achieved by adding an equal volume of a synthetic oil. The synthetic oil was composed of 90 volume percent of a paraffinic oil and 10 volume per- cent of an aromatic oil, available respectively from the Exxon Company as "Isopar M" and "Heavy Aromatic Naphtha". Curve 30 is a composite curve illustrating the results of three different experiments which yielded substantially identical results. In one case, the sample was aged in a vial which had been evacuated to simulate a true anaerobic condition. In the other two tests, two crude oils, one a South Texas aromatic crude and the other West Texas paraffinic crude, were added to the surfactant solution in a 1:1 volume ratio of oil and aqueous solution. As illustrated by FIG. 8, the crude oils were far more effective in protecting the surfactant against the autoxidative destruction mechanism than the refined oil system indicated by curve 28. The effectiveness of the crude oils in this regard is probably due to the presence of naturally occurring phenolic derivatives which are known to be inhibitors of autoxidative reactions.

Figure 9:
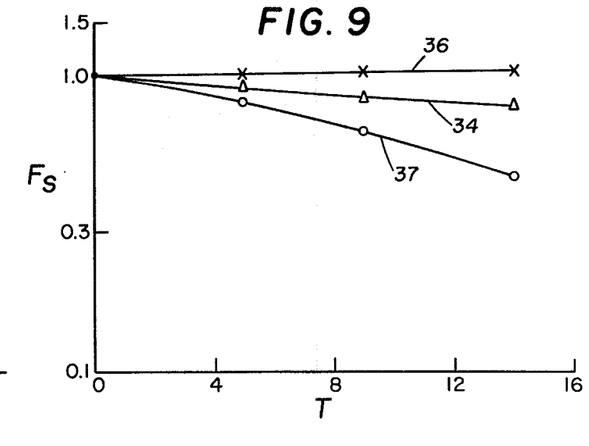

As indicated by the previously described experimental data, the free radical chain inhibitors are far more effective than other types of antioxidants such as inhibitors of enzymic oxidation or oxygen scavenging agents. Further experimental work was carried out employing 2,6-di-tert.-butyl phenol to determine the minimum amount necessary to stabilize the ether-linked sulfonates against degradation. The results of this set of experiments are illustrated in FIG. 9 which is a graph of the logarithm of the remaining surfactant fraction, $F_S$, on the ordinate versus the elapsed time, T, in days on the abscissa. The ether-linked sulfonate employed in this experimental work was the dodecyl polyethoxypropane sulfonate identified previously as surfactant S-2. Curve 37 in FIG. 9 illustrates the rate of degradation of the surfactant without an oxidation inhibitor. Curve 34 indicates the degradation rate in an aqueous surfactant solution containing 1 part per million of the 2,6-di-tert.-butyl phenol and curve 36 illustrates the degradation rate obtained when employing 10 or 100 parts per million of this oxidation inhibitor. As can be seen from an examination of the data presented in FIG. 9, only a small amount of a free radical chain inhibitor is needed to stop the oxidative degradation of the ether-linked sulfonate. A concentration of 1 ppm significantly retarded the degradation reaction and concentrations of 10 to 100 ppm provided substantially complete protection of the ether-linked sulfonates against the oxidative reaction as did the higher concentration of 0.1 percent (1000 ppm) as observed in FIG. 7.

In actual waterflooding operations, reducing conditions in the reservoir will offer a measure of protection against degradation of the ether-linked sulfonate. The presence of crude oil and various inorganic materials such as ferrous iron in the formation will initially impose a reducing condition on the aqueous surfactant solution. However, as the waterflood progresses, reservoir oil is displaced from the formation adjacent the injection wells. In addition, the capacity of inorganic minerals in the reservoir which act as reducing agents will be consumed by the first portions of the surfactant slug. Thus, depending upon the stage of the surfactant slug, several days or months may pass before the surfactant formulation will have traversed the oil-free region around the injection system and reached a portion of the reservoir that can still impose a reducing condition. For example, under typical flow conditions of a surfactant waterflood, a surfactant solution may travel a radial distance from the injection well of 25 feet in 4 days and about 50 feet in 16 days. Thus, assuming effective displacement of the reservoir oil by the surfactant, it can be seen that substantial and even complete degradation of the surfactant can occur under reservoir conditions before the surfactant solution reaches an area of the reservoir under reducing conditions such as imposed by the hydrogenous reservoir oil. Thus, the need for stabilization of the surfactant against the degradation mechanism commences shortly after the start of surfactant injection and progressively increases as the surfactant waterflood matures and displaces reservoir oil away from the injection system at increasingly greater distances.

The antioxidant may be added to the ether-linked sulfonate solution in any suitable amount as required to protect the surfactant from oxidative degradation. As indicated by the previously described experimental data, concentrations of 10 to 100 parts per million were found to provide substantially complete protection against the autoxidation reaction. While somewhat higher concentrations may be employed in order to accommodate possible adsorption of the antioxidant, it normally will be sufficient to employ the antioxidant in a concentration of 0.1 weight percent or less.

Any suitable oxidation inhibitor which functions as a free radical chain inhibitor may be employed in carrying out the invention. A preferred class of inhibitors, as indicated previously, includes the sterically hindered phenolics. These compounds are phenols substituted at the 2 and 6 positions with relatively bulky pendant groups which function to "crowd" the hydroxy group and promote dissociation thereof to provide a relatively stable free radical. The 2,6 substituents typically may take the form of branched alkyl radicals such as isopropyl, tertiarybutyl and tertiaryamyl radicals, hydroxyalkyls such as hydroxytertiarybutyl and hydroxytertiaryamyl groups, aryl groups such as phenyl, benzyl, hydroxyphenyl, and hydroxybenzyl groups, and other bulky groups which act sterically to promote dissociation of the hydroxy group. The sterically hindered phenols may also be substituted at the 4 position with a lower alkyl group containing up to about 4 carbon atoms or with a polar group to increase the water solubility of the molecule. Suitable polar substituents include hydroxy, hydroxyalkyl, alkylamino, ethylene oxide, sulfonate, and carboxy groups. Such disubstituted or trisubstituted phenols may be characterized by the formula:

(5)

wherein $R_1$ and $R_2$ are each independently bulky groups which act sterically to promote dissociation of the hydroxy group as described above and $R_3$ is hydrogen or a lower alkyl or polar substituent as described above. Examples of suitable sterically hindered phenolics, in addition to those mentioned earlier, include: 2,6-di-isoprop. phenol; 2,6-di-tert. amyl phenol; 2-isopropyl 6-tert. butyl phenol; 2-tert. butyl-6-tert. amyl phenol; 2,6-bis(4-hydroxyphenyl) phenol; 2,6-bis(4 hydroxybenzyl) phenol; 2-tert. butyl-6-(4-hydroxybenzyl) phenol; 1,3,5-trimethyl-2,4,6-tris(3,5-di-tert. butyl-4-hydroxybenzyl) benzene; 2,4,6-tris(2-hydroxy-tert. butyl) phenol; and 2,4,6-tri-tert. butyl phenol. Other suitable free radical chain inhibitors include analogous thiols. As noted previously, the oxidation inhibitors may be employed alone or in combination with protective means such as the establishment of anaerobic conditions through the use of surface mechanical means as described above.

We claim:

1. In an improved method for the recovery of oil from a subterranean oil reservoir penetrated by spaced injection and production systems in which water containing no oil is injected into said reservoir via said injection system to displace oil to said production system, the method comprising employing, as at least a portion of the water injected into said reservoir, water containing an ether-linked sulfonate surfactant, the ether link containing from 1 to 20 aklylene oxide units, said alkylene oxide units being derived from ethylene oxide, propylene oxide or mixtures thereof, the improvement comprising adding to said water containing said surfactant, to stabilize same, an oxidation inhibiting amount of a sterically hindered phenolic compound.

2. The method of claim 1 wherein the inhibitor is employed in a concentration no greater than 0.1 weight percent.

3. The method of claim 1 wherein said water has a divalent metal ion concentration of at least 0.05 weight percent.

4. The method of claim 1, wherein the ether-linked sulfonate has the formula $$R_1-O(C_nH_{2n}O)_xR_2-SO_3M$$
$$\overset{R_3}{|}$$

wherein:
- $R_1$ is a lipophilic base provided by a $C_{10}$ to $C_{22}$ aliphatic group or an aliphatic substituted aryl group containing from 8 to 24 carbon atoms with at least one aliphatic substituent containing at least 6 carbon atoms;
- $R_2$ is a $C_1$ to $C_4$ saturated aliphatic hydrocarbon group;
- $R_3$ is hydrogen, a hydroxy group or a methyl group;
- $n$ is 2 or 3;
- $x$ is 1 to 20; and
- M is an alkali metal, an ammonium ion or a substituted ammonium ion.

5. The method of claim 1 wherein said sterically hindered phenolic compound is selected from the group consisting of
  2,6-ditertiarybutyl phenol,
  2,6-ditertiarybutyl-4-hydroxymethyl phenol,
  2,6-diisopropyl phenol,
  2,6-ditertiaryamyl phenol,
  2-isopropyl-6-tertiarybutyl phenol,
  2-tertiarybutyl-6-tertiaryamyl phenol,
  2,6-bis(4-hydroxyphenyl) phenol,
  2,6-bis(4-hydroxybenzyl) phenol,
  2-tertiarybutyl-6-(4-hydroxybenzyl) phenol,
  1,3,5-trimethyl-2,4,6-tris(3,5-ditertiarybutyl-4-hydroxybenzyl) benzene
  2,4,6-tris(2-hydroxytertiarybutyl) phenol and
  2,4,6-tritertiarybutyl phenol.

* * * * *

UNITED STATES PATENT AND TRADEMARK OFFICE
CERTIFICATE OF CORRECTION

PATENT NO. : 4,331,543
DATED : May 25, 1982
INVENTOR(S) : PEGGY M. WILSON and JULIE PAO It is certified that error appears in the above-identified patent and that said Letters Patent are hereby corrected as shown below:

Column 6, line 52, "to" should read --or--.

Column 10, line 11, "use" should read --case--.

Signed and Sealed this

Twenty-first Day of September 1982

[SEAL]

Attest:

GERALD J. MOSSINGHOFF

Attesting Officer

Commissioner of Patents and Trademarks